(12) United States Patent
Shiratsuchi et al.

(10) Patent No.: US 8,004,655 B2
(45) Date of Patent: Aug. 23, 2011

(54) AUTOMATIC FOCUS ADJUSTING MECHANISM AND OPTICAL IMAGE ACQUISITION APPARATUS

(75) Inventors: Masataka Shiratsuchi, Kawasaki (JP); Yoshinori Honguh, Yokohama (JP); Masatoshi Hirono, Kanagawa (JP); Riki Ogawa, Kanagawa (JP); Shinji Sugihara, Tokyo (JP)

(73) Assignees: Kabushiki Kaisha Toshiba, Tokyo (JP); NEC Corporation, Tokyo (JP)

( * ) Notice: Subject to any disclaimer, the term of this patent is extended or adjusted under 35 U.S.C. 154(b) by 0 days.

(21) Appl. No.: 12/729,307

(22) Filed: Mar. 23, 2010

(65) Prior Publication Data

US 2010/0247085 A1 Sep. 30, 2010

(30) Foreign Application Priority Data

Mar. 26, 2009 (JP) ................................. 2009-076753

(51) Int. Cl.
*G03B 27/34* (2006.01)
(52) U.S. Cl. ...................... 355/55; 250/201.3; 250/201.4
(58) Field of Classification Search ................... 355/55; 250/201.3, 201.4
See application file for complete search history.

(56) References Cited

U.S. PATENT DOCUMENTS

| 5,530,237 | A | * | 6/1996 | Sato et al. ................... 250/201.4 |
| 5,825,468 | A | * | 10/1998 | Ishimaru ......................... 355/55 |
| 6,798,493 | B2 | * | 9/2004 | Imanishi ........................ 355/55 |
| 6,813,000 | B1 | * | 11/2004 | Nishi .............................. 355/53 |
| 7,394,048 | B2 | * | 7/2008 | Inoue et al. ................. 250/201.2 |
| 7,864,308 | B2 | * | 1/2011 | Sato ............................. 356/123 |

FOREIGN PATENT DOCUMENTS

| JP | 05-297262 | 11/1993 |
| JP | 06-102011 | 4/1994 |
| JP | 2007-225311 | 9/2007 |
| JP | 2007-306013 | 11/2007 |

* cited by examiner

*Primary Examiner* — W. B. Perkey
(74) *Attorney, Agent, or Firm* — Turocy & Watson, LLP

(57) ABSTRACT

In an automatic focus adjusting mechanism, a test sample having a patterned surface is mounted on a mount table, and an light beam passing through a slit formed in a field stop is applied to the patterned surface of the test sample. The light beam reflected from the test sample is split into two segment light beams. Focus adjusting aperture stops having respective apertures formed rhomboid are provided across the optical paths of the segment light beams. The amounts of the segment light beams passing through the rhomboid apertures are detected by light receiving units. Based on the difference between the detected light amounts, the position of the mount table is controlled by the focus adjusting unit.

6 Claims, 8 Drawing Sheets

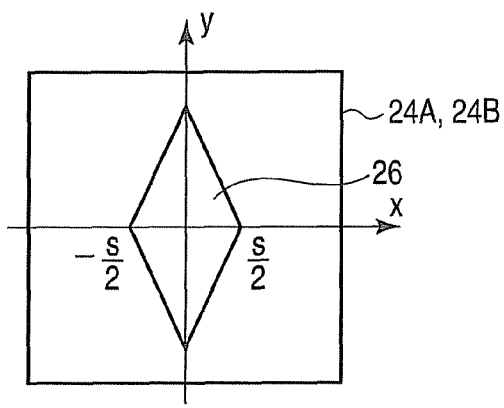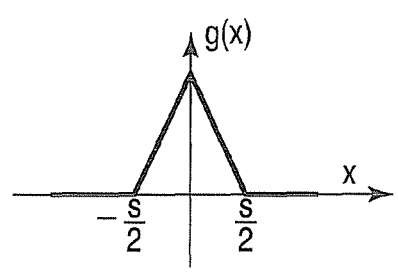
FIG. 3A                    FIG. 3B
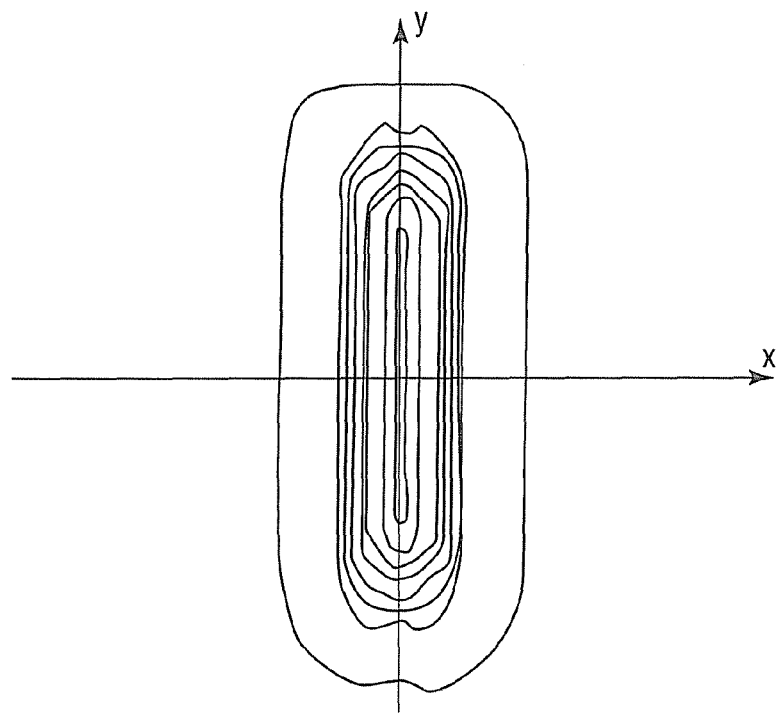
FIG. 4A
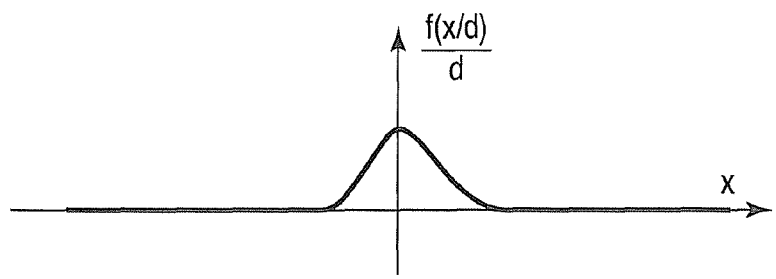
FIG. 4B

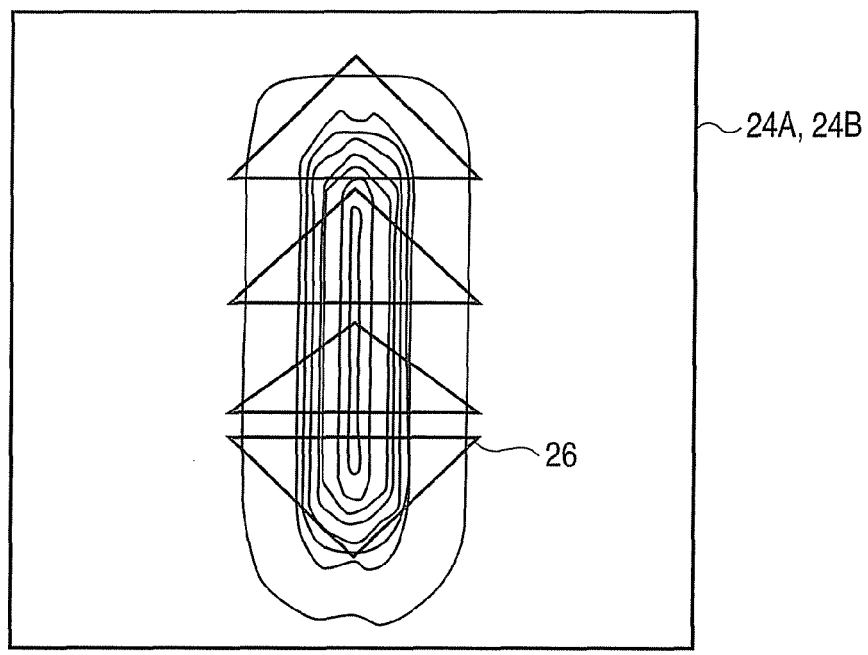
F I G. 10
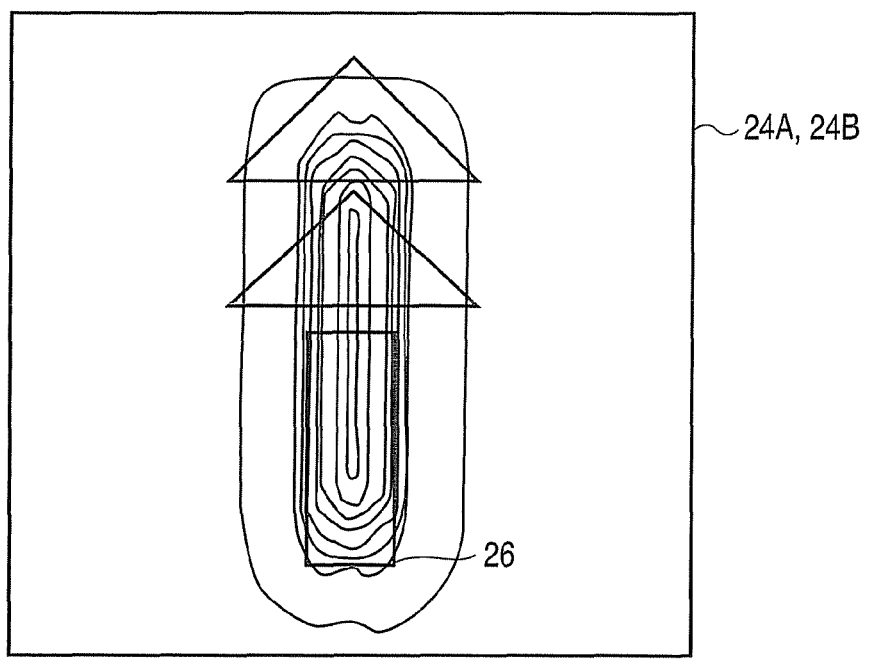
F I G. 11

AUTOMATIC FOCUS ADJUSTING MECHANISM AND OPTICAL IMAGE ACQUISITION APPARATUS

CROSS-REFERENCE TO RELATED APPLICATIONS

This application is based upon and claims the benefit of priority from prior Japanese Patent Application No. 2009-076753, filed Mar. 26, 2009, the entire contents of which are incorporated herein by reference.

BACKGROUND OF THE INVENTION

1. Field of the Invention

The present invention relates to an automatic focus adjusting mechanism for focus adjustment, and to an optical image acquisition apparatus with the automatic focus adjusting mechanism, which is used to acquire an optical image of a pattern formed on a test sample such as a mask.

2. Description of the Related Art

In optical apparatuses, such as lithography apparatuses for transferring a circuit pattern to a semiconductor substrate, and defect testing apparatuses for testing a semiconductor integrated circuit pattern, it is necessary to acquire an optical image with high resolution equal to or less than the circuit pattern size. To acquire an optical image with such high resolution, an automatic focus adjusting mechanism is indispensable, which can keep constant the distance between a test sample, such as a semiconductor substrate, and an object lens, and can focus on the test sample. There is a demand for enhancing the accuracy of the automatic focus adjusting mechanism.

There exist various types of automatic focus adjusting mechanisms, and JP-A No. 6-102011 (KOKAI), for example, discloses an automatic focus adjusting mechanism of an optical lever scheme. In this scheme, a light beam is obliquely applied to the surface of a test sample, and the light reflected therefrom is detected by a light-receiving sensor. Focus adjustment is performed utilizing the fact that the output of the light-receiving sensor varies depending upon the surface position of the test sample along the optical axis. Namely, the detection output contains information indicating the surface position of the test sample, and hence a focus error signal corresponding to the surface position is extracted from the detection output. The focus error signal is fed back to a control circuit, and the control circuit controls the position of a table, on which the test sample is placed, to an image pickup position (a so-called focal position) with high accuracy. As a result, the test sample has its surface position adjusted so that an image pickup optical system as a main optical system can be focused on the test sample with high accuracy.

However, this scheme requires a light source for generating a focusing laser beam, in addition to a light source for picking up pattern images, which inevitably makes the optical system complex. Further, in accordance with increases in the degree of complexity of the optical system, the cost of the system will inevitably be increased. This also sets restraints on designing the optical system. If a light source of a wavelength longer than that of the pattern pickup light source is used to suppress the cost, the difference in wavelength may lead to a focus adjustment error.

JP-A No. 5-297262 (KOKAI) discloses an automatic focus adjusting mechanism of a differential pinhole scheme, and JP-A Nos. 2007-306013 and 2007-225311 (KOKAI) disclose automatic focus adjusting mechanisms of a differential slit scheme. In these schemes, a light beam is emitted to the surface of a test sample, and the light beam reflected therefrom is split into two segment light beams by a beam splitter. The amount of each segment light beam is detected, and the focus is adjusted based on the detected light amounts.

Specifically, in the focus adjusting method disclosed in JP-A No. 2007-225311, a thin rectangular slit image is projected on the surface of the test sample placed on a mount table, and the light beam reflected therefrom is collected by an object lens and an image reconstructing optical system. The reflected light beam is split into first and second segment light beams by a beam splitter. Across the optical path (first optical path) corresponding to the first segment light beam, a focus adjusting aperture and a light receiving unit are provided closer to the test sample than the image forming plane on which a slit image is formed by an image forming lens. Further, across the optical path (second optical path) corresponding to the second segment light beam, a focus adjusting aperture and a light receiving unit are provided remoter from the test sample than the image forming plane. Each focus adjusting aperture is formed in a thin rectangle of an appropriate width. When a focus error has occurred, the slit image on the light receiving unit provided across one of the first and second optical paths is widened, while the slit image on the light receiving unit provided across the other optical path is narrowed. As a result, one of the signals output from the light receiving units provided across both optical paths has a higher level than the other signal. By adjusting the position of the mount table to make equal the amounts of light detected by the light receiving units for focal adjustment, the object lens can be focused on the test sample.

The focus adjusting method disclosed in JP-A No. 2007-225311 does not require a light source that differs from the light source used for picking up an image of the test sample. Further, in the above-mentioned schemes, if no patterns are formed on a mask, or if a relatively rough pattern is formed on the mask, the focus adjusting apertures are set across the first and second optical paths to include therein the major part of the widthways portion of a light amount distribution corresponding to the slit image. As a result, a focus error can be detected with high accuracy.

However, in this method, it is possible that the slit image projected on the test sample (mask surface) will be subjected to diffraction effect due to a mask pattern formed on the test sample, whereby the light amount distribution on the focus adjusting aperture plane will be scattered to make it difficult to detect the focus. This problem will be conspicuous if a very fine pattern is formed on the test sample, since the very fine pattern causes serious diffraction effect.

As described above, when a fine pattern is formed on a test sample, the light beam reflected therefrom will be diffracted. The diffraction will cause the light amount distribution of a slit image on the focus adjusting aperture plane to vary and become wider. In particular, in an automatic focus adjusting mechanism using a focus adjusting aperture stop with a rectangular aperture, the light amount detected by a focal adjustment light receiving unit is extremely reduced. Further, if the light amount distribution at the edge of the aperture formed in the focus adjusting aperture stop is reduced, correct focus error detection cannot be realized. These problems will be caused by diffraction effect of a pattern formed on the surface of a test sample. Since test samples have different patterns, changes in light amount due to diffraction cannot be estimated beforehand. In view of the above-mentioned problems, there is a demand for development of an automatic focus adjusting mechanism capable of reliably detecting a focus error regardless of the pattern formed on the surface of a test sample, and development of an optical image acquisition apparatus equipped with the automatic focus adjusting mechanism.

BRIEF SUMMARY OF THE INVENTION

According to an aspect of the invention, there is provided an apparatus for acquiring an optical image, comprising: a movable table on which a test sample having a patterned surface is mounted; a light source configured to apply first and second light beams on the patterned surface to form first and second areas, respectively, the first area being defined as an image pickup area on the patterned surface and the second area being formed as a focus adjusting area to have a substantially rectangular shape with long and short sides; an image acquiring unit configured to detect a third light beam which is reflected from the first area or is transmitted through the first area, and acquire an image of the image pick up area from the third light beam when the patterned surface is located in an image pickup position; a focusing optical system including a splitting element configured to split a fourth light beam into first and second segment light beams, which is reflected from the second area, wherein the first and second segment light beams are directed to first and second optical paths and focused on first and second image forming planes, respectively, when the patterned surface is positioned at the image pickup position; a first aperture stop having a first aperture, which is located in the first optical path between the first image forming plane and the splitting element, wherein the first aperture has first and second axes crossing on a first origin point and corresponding to the short and long sides, respectively, and has a first aperture length along the second axis, and the first aperture length is maximum on the first origin point and is decreased along the first axis depending on a first distance from the first origin point along the first axis; a second aperture stop having a second aperture, which is located in the second optical path such that the second image forming plane is arranged between the splitting element and the second aperture, wherein the first aperture has third and fourth axes crossing on a second origin point and corresponding to the short and long sides, respectively, and has a second aperture length along the third axis, and the second aperture length is maximum on the second origin point and is decreased along the third axis depending on a second distance from the second origin point along the third axis; a detection unit configured to detect the first and second segment light beams passing through the first and second apertures to output first and second detection signals, respectively; and a control unit configured to control a position of the movable table based on the first and second detection signals.

According to another aspect of the invention, there is provided an apparatus for acquiring an optical image, comprising: a movable table on which a test sample having a patterned surface is mounted; a first light source configured to apply a first light beam on another surface of the test sample opposite to the patterned surface to form a first area, the first area being defined as an image pickup area on the patterned surface; a second light source configured to apply a second light beam on the patterned surface to form a second area, the second area being formed as a focus adjusting area to have a substantially rectangular shape with long and short sides; an image acquiring unit configured to detect a third light beam which is transmitted through the first area, and acquire an image of the image pick up area from the third light beam when the patterned surface is located in an image pickup position; a focusing optical system including a splitting element configured to split a fourth light beam into first and second segment light beams, which is reflected from the second area, wherein the first and second segment light beams are directed to first and second optical paths and focused on first and second image forming planes, respectively, when the patterned surface is positioned at the image pickup position; a first aperture stop having a first aperture, which is located in the first optical path between the first image forming plane and the splitting element, wherein the first aperture has first and second axes crossing on a first origin point and corresponding to the short and long sides, respectively, and has a first aperture length along the second axis, and the first aperture length is maximum on the first origin point and is decreased along the first axis depending on a first distance from the first origin point along the first axis; a second aperture stop having a second aperture, which is located in the second optical path such that the second image forming plane is arranged between the splitting element and the second aperture, wherein the first aperture has third and fourth axes crossing on a second origin point and corresponding to the short and long sides, respectively, and has a second aperture length along the third axis, and the second aperture length is maximum on the second origin point and is decreased along the third axis depending on a second distance from the second origin point along the third axis; a detection unit configured to detect the first and second segment light beams passing through the first and second apertures to output first and second detection signals, respectively; and a control unit configured to control a position of the movable table based on the first and second detection signals.

According to yet another aspect of the invention, there is provided an automatic focus adjusting apparatus comprising: a movable table on which a test sample having a patterned surface is mounted; a light source configured to apply a light beam on the patterned surface to form an area, the area being formed as a focus adjusting area to have a substantially rectangular shape with long and short sides; a focusing optical system including a splitting element configured to split a second light beam into first and second segment light beams, which is reflected from the area, wherein the first and second segment light beams are directed to first and second optical paths and focused on first and second image forming planes, respectively, when the patterned surface is positioned at a prescribed position; a first aperture stop having a first aperture, which is located in the first optical path between the first image forming plane and the splitting element, wherein the first aperture has first and second axes crossing on a first origin point and corresponding to the short and long sides, respectively, and has a first aperture length along the second axis, and the first aperture length is maximum on the first origin point and is decreased along the first axis depending on a first distance from the first origin point along the first axis; a second aperture stop having a second aperture, which is located in the second optical path such that the second image forming plane is arranged between the splitting element and the second aperture, wherein the first aperture has third and fourth axes crossing on a second origin point and corresponding to the short and long sides, respectively, and has a second aperture length along the third axis, and the second aperture length is maximum on the second origin point and is decreased along the third axis depending on a second distance from the second origin point along the third axis; a detection unit configured to detect the first and second segment light beams passing through the first and second apertures to output first and second detection signals, respectively; and a control unit configured to control a position of the movable table based on the first and second detection signals.

BRIEF DESCRIPTION OF THE SEVERAL VIEWS OF THE DRAWING

FIG. 3A is a schematic view illustrating the focus adjusting aperture stops shown in FIG. 1;

FIG. 3B is a graph illustrating an aperture function associated with the aperture shown in FIG. 3A;

FIG. 4A is a schematic view illustrating, using level lines, the light amount distribution of a light beam at a focus adjusting aperture at which the focus adjusting aperture stop shown in FIG. 1 is provided;

FIG. 4B is a graph illustrating the light amount distribution shown in FIG. 4A;

FIG. 10 is a schematic view illustrating a focus adjusting aperture stop of a shape different from that of the focus adjusting aperture stops shown in FIG. 1;

FIG. 11 is a schematic view illustrating a focus adjusting aperture stop of a shape different from that of the focus adjusting aperture stops shown in FIG. 1;

DETAILED DESCRIPTION OF THE INVENTION

Optical image acquisition apparatuses with automatic focus adjusting mechanisms according to embodiments of the invention will be described with reference to the accompanying drawings.

First Embodiment

Figure 1:
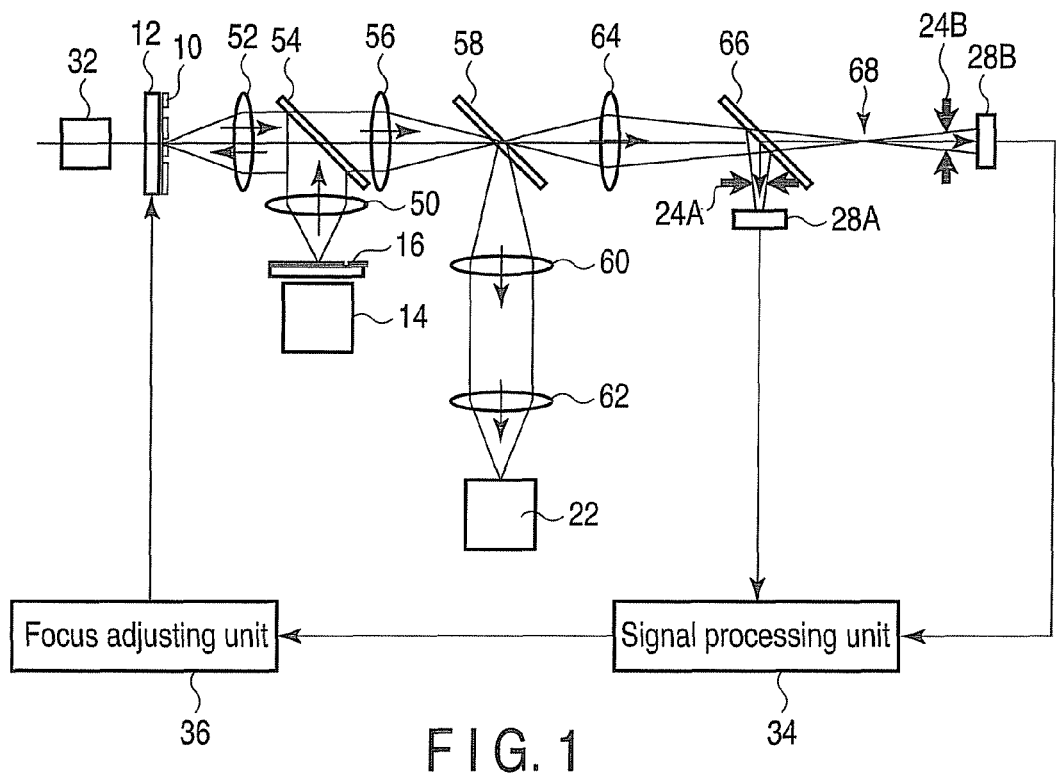
FIG. 1 is a schematic view illustrating an optical image acquisition apparatus with an automatic focus adjusting mechanism, according to a first embodiment of the invention.

FIG. 1 is a schematic view illustrating an optical image acquisition apparatus with an automatic focus adjusting mechanism, according to a first embodiment of the invention. As shown in FIG. 1, in the optical image acquisition apparatus, a test sample 10, such as a mask (or photomask), is placed on a mount table 12. An image of a pattern on the test sample 10 is picked up by an optical image receiving unit 22. An automatic focus adjusting mechanism incorporated in the optical image acquisition apparatus causes an object lens 52 to focus on the surface of the test sample 10, i.e., adjusts the position of the mount table 12, with the test sample 10 mounted thereon, along the optical axis so that the distance between the test sample 10 and the object lens can be kept constant in the focused state. As will be described later, in the automatic focus adjusting mechanism, an observation light beam emitted from a reflection observing light source 14 is reflected by the surface of the test sample 10, and the light amounts of the reflected light beam are detected by light receiving units (or detection units) 28A and 28B for focal adjustment. Based on the difference between the detected light amounts, which corresponds to a focus error, the automatic focus adjusting mechanism performs feedback processing. Namely, the automatic focus adjusting mechanism adjusts the position of the mount table 12 based on the detected light amounts that vary in accordance with the position of the mount table 12 along the optical axis, thereby shifting the mount table 12 to the focused position which may be referred to as a image pickup position. Since thus the mount table 12 with the test sample 10 mounted thereon is kept at the focused position, a focused optical image of the surface of the test sample 10 is obtained by image pickup using the optical image receiving unit 22. Data indicating the photographed optical image is output to, for example, a pattern test apparatus (not shown), where a defect on the test sample, for example, is detected.

An original plate, such as a reticle or a photomask for transferring a microcircuit pattern to a photosensitive substrate, such as a wafer or glass on which a photoresist is applied, and the substrate with the circuit pattern transferred thereon, are regarded as examples of the test sample 10. In the embodiments described below, a mask as an example of the test sample 10 is placed on the mount table (or movable table) 12 for facilitating the description. However, it is apparent that the test sample 10 is not limited to the mask, but may be any other appropriate type of test sample. Further, it should be noted that the obverse surface of a patterned mask will be referred to simply as a "patterned mask surface."

The optical image acquisition apparatus shown in FIG. 1 comprises the reflection observing light source 14 for applying an observation light beam to a mask 10 mounted on the mount table 12. The observation light beam generated by the reflection observing light source 14 is directed to a field stop 16 with an observation aperture 18 and a focus adjusting slit 20 formed therein. The observation light beam passing through the field stop 16 is directed to a projection lens 50. The observation light beam passing through the projection lens 50 is directed to a beam splitter 54, where it is reflected and directed to the object lens 52. The observation light beam passing through the object lens 52 is converged onto the patterned mask surface. The test sample 10 is mounted on the mount table 12 movable along the optical path of the observation light beam that enters the patterned mask surface. The mount table 12 is moved by a focus adjusting unit (or control unit) 36 along this optical path to focus the object lens 52 on the patterned mask surface, and the distance between the mount table 12 and the object lens 52 is kept constant with the object lens 52 focused on the patterned mask surface. Further, the mount table 12 is movable on the plane perpendicular to the optical path, and an image pickup area on the patterned mask surface is varied by slightly varying the position of the mount table 12 on the plane using a fine motion mechanism (not shown). In the optical system between the reflection observing light source 14 and the test sample 10, the field stop 16 is provided on a surface corresponding to the patterned surface of the mask 10 mounted on the mount table 12.

Figure 2:
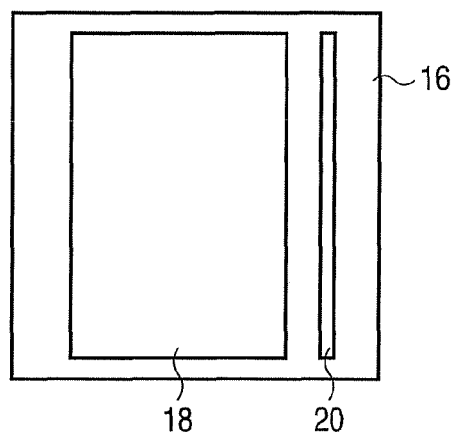
FIG. 2 is a schematic view illustrating the field stop shown in FIG. 1.

FIG. 2 shows a shape example of the field stop 16. As shown in FIG. 2, the field stop 16 has a rectangular observation aperture 18 for defining an observation area on the test sample 10, and a slim rectangular focus adjusting slit 20 for forming a focus adjusting project pattern on the test sample 10. The observation aperture 18 limits the irradiation range of the observation light beam so that the observation light beam will be directed to the patterned mask surface to form the image pickup area. The focus adjusting slit 20 limits the irradiation range of the observation light beam so that the observation light beam will be directed to the patterned mask surface to form a focus adjusting area. The focus adjusting area has a substantially rectangular shape with long and short sides. Accordingly, on the focus adjusting area, a slim rectangular image formed by the observation light beam passing through the focus adjusting slit 20 is projected.

In the optical image acquisition apparatus shown in FIG. 1, an image of the pattern formed on the mask is picked up as follows: The observation light beam passing through the observation aperture 18 passes through the projection lens 50 and reflects from the beam splitter 54. The observation light beam reflected by beam splitter 54 is directed through the object lens 52 onto the image pickup area of the patterned mask surface. The light beam reflected from the patterned mask surface is directed to the optical image receiving unit 22 via an image forming optical system. The image forming optical system comprises, for example, the object lens 52, a tube lens 56, a field separation mirror 58, a collimator lens 60 and an image forming lens 62, and an image of the pattern on the patterned mask surface is formed on the optical image receiving unit 22. Specifically, the light beam reflected from the patterned mask surface reaches an image forming plane, on which a pattern image is formed, via the object lens 52, the beam splitter 54 and the tube lens 56. The reflected light beam has its optical path changed by the field separation mirror 58 arranged on the image forming plane so that it enters the optical image receiving unit 22 via the collimator lens 60 and the image forming lens 62. Thus, the pattern image corresponding to the reflected light beam is picked up by the optical image receiving unit 22. The optical image receiving unit 22 is formed of, for example, an area sensor, such as a CCD image sensor with two-dimensionally arranged light sensitive elements. The optical image receiving unit 22 and image forming optical system are collectively called an image acquiring unit.

The field separation mirror 58 is located so that it selectively reflects the light beam reflected from a particular area (image pickup area) that is included in a viewing field defined on the patterned mask surface. Namely, the field separation mirror 58 reflects the light beam passing through the observation aperture 18 and then reflected from the image pickup area, and passes therethrough the light beam passing through the focus adjusting slit 20 and then reflected from the focus adjusting area. The field separation mirror 58 changes the optical path of the reflected light beam, for example, through 90°.

The optical image acquisition apparatus shown in FIG. 1 may be constructed such that a transmission observing light source 32 faces the patterned mask surface for applying a transmission observing light beam. In this case, the transmission observing light beam emitted from the transmission observing light source 32 passes through the image pickup area of the patterned mask surface 10 to the object lens 52, and then reaches the optical image receiving unit 22 via the optical image forming system, whereby an image of the pattern on the patterned mask surface is picked up.

A description will now be given of the automatic focus adjusting mechanism for automatically focusing the object lens 52 on the patterned surface of the mask 10. As shown in FIG. 1, the observation light beam passing through the focus adjusting slit 20 formed in the field stop 16 passes through the projection lens 50 and reflects from the beam splitter 54. The observation light beam reflected by the beam splitter 54 forms, on the patterned mask surface, a projection pattern for focus adjustment. The projection pattern for focus adjustment is formed as a slim, rectangular slit image corresponding to the shape of the focus adjusting slit 20. The reflection observing light source 14, the field stop 16, the beam splitter 54 and the object lens 52 provide a slit image forming apparatus for forming a slit image on the patterned mask surface.

The observation light beam passing through the slit 20 reflects on the patterned mask surface. The light beam reflected by the area of the patterned mask surface, on which the slit image is projected, namely, the focus adjusting area, passes through the field separation mirror 58 to an image re-forming optical system 64. The image re-forming optical system 64 focuses the reflected light beam on an image re-forming plane. A half mirror 66 for splitting an input light beam into two segments of substantially the same amount is located between the image re-forming optical system 64 and each of image re-forming planes and closer to each image re-forming plane. The reflected light beam output from the image re-forming optical system 64 is split into first and second segment light beams. The first and second segment light beams pass through first and second optical paths, respectively. Across the first optical path, a focus adjusting aperture stop 24A is provided in front of one (not shown) of the image re-forming planes defined by the image re-forming optical system 64 (i.e., the stop 24A is provided at a position close to the half mirror 66), and the light receiving unit 28A for focal adjustment is provided to detect the first segment light beam that passes through the aperture stop 24A. Thus, across the first optical path, the focus adjusting aperture stop 24A is located between the half mirror 66 and the image re-forming plane defined by the image re-forming optical system 64. Further, across the second optical path, a focus adjusting aperture stop 24B is provided behind the other image re-forming plane 68 defined by the image re-forming optical system 64 (i.e., the stop 24B is provided at a position remote from the half mirror 66), and a light receiving unit 28B is provided to detect the second segment light beam passing through the aperture stop 24B. Thus, across the second optical path, the focus adjusting aperture stop 24B is located such that the image re-forming plane 68 defined by the image re-forming optical system 64 is arranged between the half mirror 66 and the focus adjusting aperture stop 24B. The image re-forming planes defined by the image re-forming optical system 64 is image planes, on which the slit image projected on the patterned mask surface is re-formed by the image re-forming optical system 64 when the position of the patterned mask surface is adjusted to the image pickup position of the image pickup optical system.

The image re-forming optical system 64 may have any structure, if it can form an image of the reflected light beam input thereto. The image-forming optical system in the automatic focus adjusting mechanism of FIG. 1 comprises the object lens 52, the tube lens 56, the image re-forming optical system 64 and the half mirror (or splitting element) 66. The light receiving units 28A and 28B are each formed of, for example, an area sensor, such as a CCD image sensor with two-dimensionally arranged light sensitive elements.

The focus adjusting aperture stop 24A is provided across the first optical path in front of the aforementioned image re-forming plane at a distance d therefrom. The distance d is equal to the value obtained by subtracting the distance between the half mirror 66 and the focus adjusting aperture stop 24A, from the distance between the half mirror 66 and the image re-forming plane. The first segment light beam guided to the first optical path is directed to the focus adjusting aperture stop 24A, and the light amount distribution of the first segment light beam passing through an aperture 26 (shown in FIG. 3A) formed in the focus adjusting aperture stop 24A is detected by the light receiving unit 28A. The focus adjusting aperture stop 24B is provided across the second optical path behind the image re-forming plane 68 at the distance d therefrom. In this case, the distance d indicates the distance between the half mirror 66 and the focus adjusting aperture stop 24B. The second segment light beam guided to the second optical path is directed to the focus adjusting aperture stop 24B, and the light amount distribution of the second segment light beam passing through an aperture 26 formed in the focus adjusting aperture stop 24B is detected by the light receiving unit 28B.

FIG. 3A schematically shows a shape example of the aperture 26 formed in each of the focus adjusting aperture stops 24A and 24B. As shown in FIG. 3A, the apertures 26 of the focus adjusting aperture stops 24A and 24B have substantially a rhomboid shape. In FIG. 3A, the center of the aperture 26 is set as the origin, and the axis perpendicular to the optical path, passing through the origin and extending along the length of the aperture 26 is defined as the y axis. Similarly, the axis perpendicular to the optical path and the y axis, passing through the origin and extending along the width of the aperture 26 is defined as the x axis. The length of the imaginary line segment at position x, which is defined in the aperture 26 by the edge of the aperture 26 and extends parallel to the y axis, is called an aperture function (or aperture length) and represented by function g(x). Assume here that the short diagonal of the aperture 26 has a length of s. As shown in FIG. 3B, the function g(x) assumes a maximum value when x=0, linearly increases when $-s/2 \leq x < 0$, and linearly decreases when $0 < x \leq s/2$. That is to say, the aperture function g(x) is maximum on the origin and is decreased along the x axis depending on a distance from the origin along the x axis.

In FIG. 3A, the xy coordinate system is defined on each of focus adjusting aperture planes on which the focus adjusting aperture stops 24A and 24B are provided. The xy coordinate system is also defined in the same way as this in other figures of this application.

Although in the first embodiment, the apertures 26 of the focus adjusting aperture stops 24A and 24B have the same shape, the invention is not limited to this. The apertures may be formed to different shapes each other. In this case, it is sufficient if they are formed to such shapes as will be described later. Further, when the apertures 26 are formed to different shapes, it is necessary to modify the setting of a signal processing unit 34 so that signal processing is performed in accordance with the shapes.

FIG. 4A shows, using level lines, a typical example of a light amount distribution corresponding to a slit image that is formed on each of the focus adjusting aperture planes, on which the focus adjusting aperture stops 24A and 24B are provided. In FIG. 4A, x and y axes are defined as in the case of the focus adjusting aperture stops 24A and 24B shown in FIG. 3A. FIG. 4B shows the light amount distribution corresponding to the slit image on the x axis. When the distance d between each focus adjusting aperture plane and the corresponding image re-forming plane is equal to a preset distance described later, the light amount distribution on the x axis is given by f(x/d)/d, using function f(x) determined in accordance with, for example, the shape of the aperture 26. A clear slit image is formed on the image re-forming plane. Namely, on each image re-forming plane, a substantially rectangular slit image, which is substantially the same as the slit 20 shown in FIG. 2, is formed. However, the slit image formed on each focus adjusting aperture plane is blurred, i.e., the slit image has a certain light amount distribution as shown in FIGS. 4A and 4B.

Figure 5:
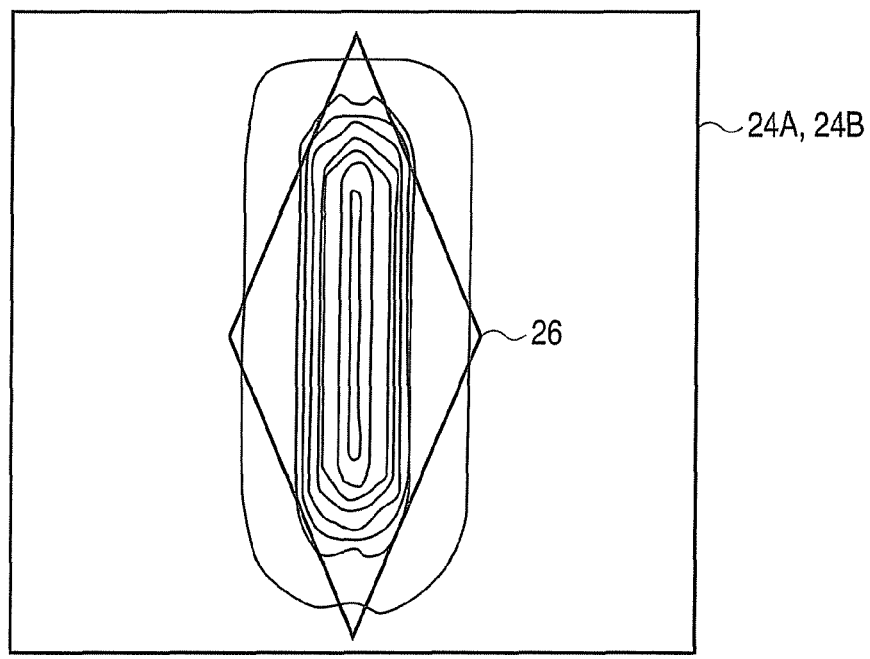
FIG. 5 is a schematic view illustrating the light amount of a light beam passing through the aperture shown in FIG. 3A.

FIG. 5 shows a state in which the light amount distribution of the slit image shown in FIG. 4A is superposed with the aperture 26 of each of the focus adjusting aperture stops 24A and 24B shown in FIG. 3A. The amount of the segment light beam (the first or second segment light beam) passing through the slit of each focus adjusting aperture stop, i.e., the amount of the entire light distributed within the aperture 26 as shown in FIG. 5, is detected by the light receiving units 28A and 28B.

As shown in FIG. 1, the light amounts of the first and second segment light beams passing through the focus adjusting aperture stops 24A and 24B are detected by the light receiving units 28A and 28B, respectively. The light receiving units 28A and 28B supply the signal processing unit 34 with light amount detection signals corresponding to the detected light amounts. In the signal processing unit 34, the two light amount detection signals pass through a differential amplifier circuit and an amplifier circuit having an appropriate frequency response, whereby the light amount difference is calculated. A feedback signal indicating a feedback amount corresponding to the light amount difference is sent to the focus adjusting unit 36. Based on the sent feedback signal (focus error signal), the focus adjusting unit 36 adjusts the position of the mount table 12 along the optical path of the irradiation light beam.

If the patterned mask surface is not adjusted to a desired position, namely, if the distance between the patterned mask surface and the object lens 52 is not kept at a preset value (image pickup distance), a focus error corresponding to the position of the patterned mask surface occurs. In this case, the slit image re-formed by the image re-forming optical system 64 appears across each of the first and second optical paths in front of or behind the respective image re-forming planes on which the slit image should be re-formed. Thus, if the re-forming plane for slit images is deviated from a desired position, the light receiving unit 28A receives a greater amount of light than the light receiving unit 28B, or vice versa.

If across, for example, the first optical path, the image re-forming plane for slit images is formed in front of the desired position, the distance between the image re-forming plane and the focus adjusting aperture stop 24A becomes shorter. In this case, since the range of the light amount distribution on the focus adjusting aperture plane becomes smaller, the amount of light passing through the aperture 26 of the focus adjusting aperture stop 24A becomes greater. In contrast, along the second optical path, the distance between the image re-forming plane and the focus adjusting aperture stop 24A becomes longer, and the range of the light amount distribution on the focus adjusting aperture plane becomes larger. Accordingly, the amount of light passing through the aperture 26 of the focus adjusting aperture stop 24B becomes smaller. In light of the above, feedback control is performed to make, equal to each other, the light amounts detected by the light receiving units 28A and 28B (i.e., to eliminate the focus error signal), thereby adjusting the patterned mask surface to a desired position. By thus controlling the mount table 12, an image of an appropriately focused mask can be always picked up.

The signal processing unit 34 and the focus adjusting unit 36 may process a light amount detection signal to control the position of the mount table 12, as follows: The signal processing unit 34 eliminates signal noise from light amount detection signals IA and IB corresponding to the light amounts detected by the focus adjusting aperture stops 24A and 24B, and calculates (IA−IB)/(IA+IB) using an adder circuit, a subtraction circuit and a dividing circuit. The difference (IA−IB) indicates a value corresponding to the difference between the light amounts of the segment light beam detected by the focus adjusting aperture stops 24A and 24B. The calculation result is divided by the sum (IA+IB) for normalization. The signal processing unit 34 monitors the difference between a light amount difference signal and a preset feedback target value. If the difference exceeds a threshold value preset for the patterned mask surface, the signal processing unit 34 instructs the focus adjusting unit 36 to adjust the position of the mount table.

A description will now be given of where the focus adjusting aperture stops 24A and 24B are located.

A slit image with a width of A and a height of B is reformed on the image re-forming plane corresponding to the patterned mask surface on which the slit image is projected. The width of A is less than the height of B (A<B). Across the first optical path, the focus adjusting aperture stop 24A is provided in front of a desired image re-forming plane at the distance d therefrom. Further, across the second optical path, the focus adjusting aperture stop 24B is provided behind a desired image re-forming plane 68 at the distance d therefrom. The distance d is determined to satisfy $A^2/2\lambda < d < B^2/2\lambda$, $\lambda$ being the wavelength of the light beam emitted from the reflection observing light source 14. The remoter from the image re-forming plane, the higher the degree of blurring of the slit image formed by the image re-forming optical system 64 (i.e., the greater the focus error), and the greater the degree of deformation of the light amount distribution.

Figure 6:
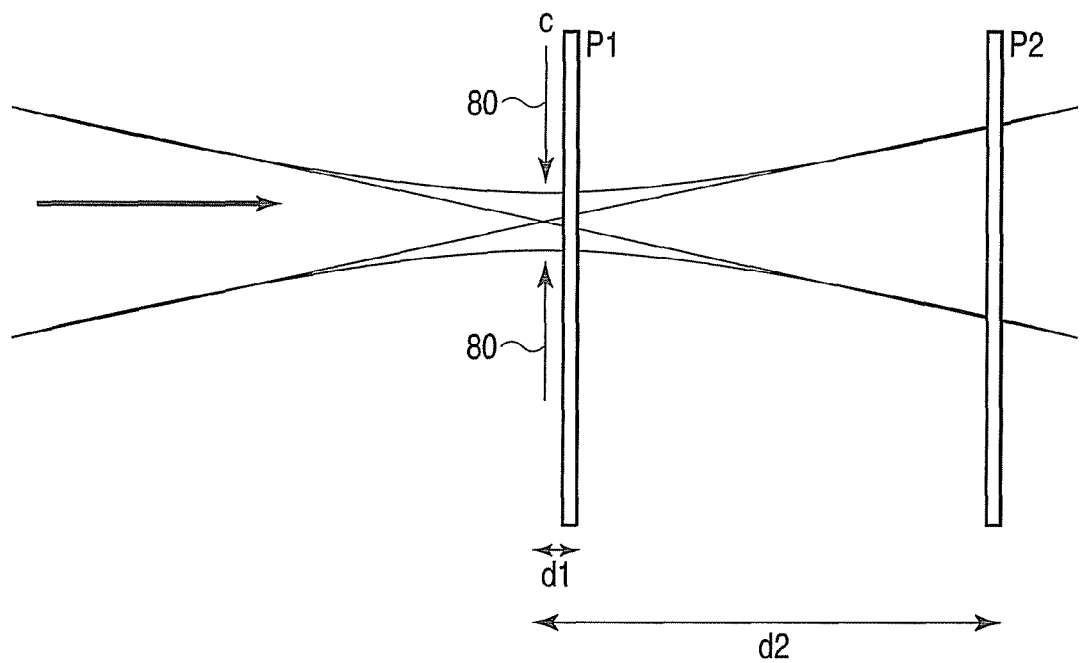
FIG. 6 is a view useful in explaining general properties of a light beam in near and far fields.

Referring now to FIG. 6, a rough description will be given of the beam diameters and light amount distributions of coherent light in a near field and a far field, and of a method for setting the distance d between the focus adjusting aperture stop 24A and the image re-forming plane of a slit image corresponding to the stop 24A, and the distance d between the focus adjusting aperture stop 24B and the image re-forming plane of the slit image corresponding to the stop 24B. FIG. 6 schematically illustrates how a light beam converged by a lens (not shown) passes through a slit 80. As shown in FIG. 6, a coherent light beam of a wavelength $\lambda$ propagates in the direction indicated by the arrow. A slit 80 having a width of C is provided at the beam waist (the narrowest portion) of the coherent light beam. A plane P1 is located parallel to the image forming plane and separate therefrom by a distance d1. The distance d1 is less than $C^2/2\lambda$ (d1<$C^2/2\lambda$). The area at the distance d1 (<$C^2/2\lambda$) corresponds to the near field (Fresnel diffraction field) of the diffraction theory along the width of the slit. Further, a plane P2 is located parallel to the image re-forming plane and separate therefrom by a distance d2. The distance d2 is more than $C^2/2\lambda$ (d2>$C^2/2\lambda$). The area at the distance d2 (>$C^2/2\lambda$) corresponds to the far field (Fraunhofer diffraction field) along the width of the slit.

In the near field, even when the plane P1 is displaced in the propagation direction of the light beam, the beam diameter of the light beam is kept at substantially the value of C. In contrast, the cross section of the light beam on the plane P1 is significantly deformed or waved as a result of interference effect when the plane P1 is slightly displaced in the propagation direction of the light beam. On the other hand, in the far field, the light beam spreads substantially in a cone shape while it is propagating. Namely, the light beam diameter increases in proportion to the distance d2 from the beam waist. Further, the light beam exhibits a cross section of a similar shape and a greater size on the plane P2, if the distance d2 between the beam waist and the plane P1 is increased.

If the light beam is incoherent light, the same light amount distributions as the above-mentioned distribution overlap each other at eye point. Accordingly, as in the case of the coherent light beam, in the far field, the light beam spreads substantially in a cone shape while it is propagating. Namely, the beam diameter increases in proportion to the distance from the beam waist, and exhibits a cross section of a similar shape regardless of the distance from the beam waist, and exhibits a size proportional to the distance from the beam waist. In the near field, the beam diameter of the light beam is kept at substantially the value of C, and the cross section of the light beam is significantly deformed as a result of interference effect when the plane P1 is slightly displaced in the propagation direction of the light beam.

In the first embodiment, the position of the slit 80 (beam waist) shown in FIG. 6 corresponds to the slit image re-forming plane. Assuming that the focus adjusting aperture stops 24A and 24B are provided in areas (d<$A^2/2\lambda$) relatively close to the respective image re-forming planes, these areas each correspond to the near field (Fresnel diffraction field) of the diffraction theory along the width of the slit. If a coherent light source is employed as the reflection observing light source 14, the longer the distance from each image re-forming plane, the more complex the deformation of the light amount distribution due to interference effect. In contrast, the width of the entire light amount distribution little changes. Namely, in the areas (d<$A^2/2\lambda$), the widthways light amount distribution of the slit image little depends upon the distance from each image re-forming plane. Accordingly, when the focus adjusting aperture stops 24A and 24B are provided in the areas, the light amounts detected by the light receiving units 28A and 28B do not greatly depend upon focal position errors. Namely, since the widthways light amount distribution does not change in accordance with the distance d between each image re-forming plane and the corresponding focus adjusting aperture, the signal-to-noise ratio (SNR) in focus error detection does not change. The same can be said, to a greater or less extent, of the case using an incoherent light source as the reflection observing light source 14.

Assuming that the focus adjusting aperture stops 24A and 24B are provided in the areas at a distance d from the respective image re-forming planes that satisfies $A^2/2\lambda < d < B^2/2\lambda$, these areas each correspond to the far field (Fraunhofer diffraction field) along the width of the slit. In these areas, the light amount distribution of the segment light beam at a certain plane parallel to each image re-forming plane spreads widthways as shown in FIG. 4B. As described above, the light amount distribution is expressed by f(x/d)/d, and depends upon the distance d from each image re-forming plane. That is, the widthways light amount distribution exhibits a similar shape regardless of the distance d from each image re-forming plane, and exhibits a size proportional to the distance d.

Namely, the longer the distance d, the wider the light amount distribution, and the lower the intensity of the light amount distribution.

These areas ($A^2/2\lambda < d < B^2/2\lambda$) correspond to the near field along the length. Namely, in areas at a distance d less than $B^2/2\lambda$ from the respective image re-forming planes, the light amount distribution along the length of the slit image is substantially uniform except for the opposite portions. Accordingly, at the focus adjusting aperture position, the light amount distribution is uniform along the width of any portion of the slit image. In the areas, the same light amount distribution is found regardless of whether a coherent light source or an incoherent light source is employed as the reflection observing light source 14. Thus, by providing the focus adjusting aperture stops 24A and 24B in the areas at distances d from the respective image re-forming planes that satisfy $A^2/2\lambda < d < B^2/2\lambda$, focus errors can be detected reliably.

Figure 7A:
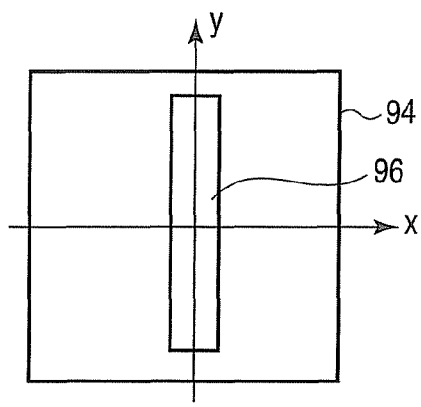
FIG. 7A is a schematic view illustrating a focus adjusting aperture stop according to a comparative example.
Figure 7B:
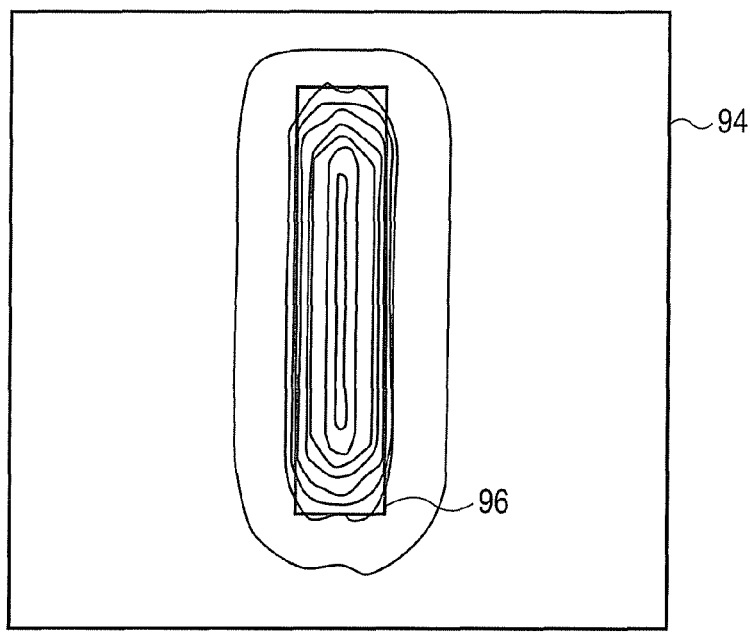
FIG. 7B is a schematic view illustrating the light amount of a light beam passing through the aperture shown in FIG. 7A.
Figure 7C:
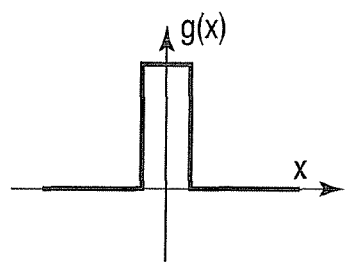
FIG. 7C is a graph indicating an aperture function associated with the aperture shown in FIG. 7A.
Figure 8:
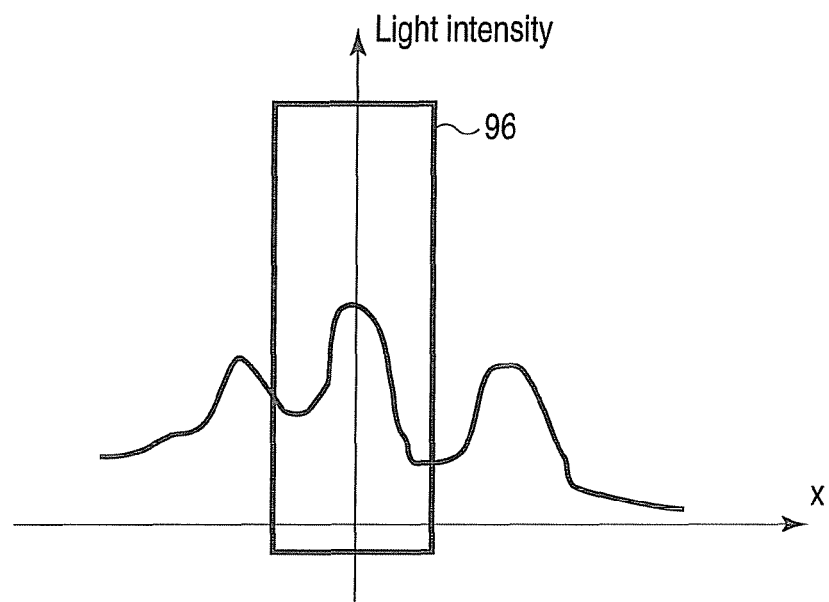
FIG. 8 is a graph indicating the light amount distribution of a light beam passing through the aperture shown in FIG. 7A, which distribution is obtained on a line parallel to the x axis.

Referring now to FIGS. 7A to 8, a description will be given of a comparative example in which the aperture of each focus adjusting aperture stop is formed simply rectangular.

FIG. 7A schematically shows a focus adjusting aperture stop 94 with a rectangular aperture 96 formed therein, according to a comparative example. As shown in FIG. 7A, the aperture 96 of the focus adjusting aperture stop 94 has a rectangular shape having a width of A. FIG. 7B shows a light amount distribution at the focus adjusting aperture stop 94 of FIG. 7A, and FIG. 7C shows the aperture function of the focus adjusting aperture stop 94 along the x axis. In the automatic focus adjusting apparatus using the focus adjusting aperture stop 94, the amount of light passing through the substantially rectangular aperture 96 formed in the focus adjusting aperture stop 94 is detected. The detected light amount changes depending upon the distance between the image re-forming plane of a slit image deviated from a desired image re-forming plane, and a focus adjusting aperture position. If the focus adjusting aperture stop has a rectangular aperture as shown in FIG. 7A, it is possible that a light amount detection signal of a level sufficient to detect a focus error will not be obtained because of diffraction of light on the patterned mask surface. The slit image projected on the patterned mask surface is diffracted by the patterned mask when it reflects therefrom. The slit image diffracting pattern may reduce the amount of light passing through the focus adjusting aperture.

In the area at the distance d from each image re-forming plane of the slit image that satisfies $A^2/2\lambda < d < B^2/2\lambda$, the widthways light amount distribution varies as expressed by $f(x/d)/d$, as is described above. As shown in FIG. 8, if the light distribution assumes a differentiation value of 0 at the opposite ends ($x=\pm s/2$) of the aperture 96, or if the intensity of the light distribution increases from the inside of the aperture 96 to the outside of the same, the light amount difference signal output from the signal processing unit 34 may have a polarity opposite to that of a desired signal. In this case, normal focal position adjustment may not be performed. Even when the light amount difference signal does not have a polarity opposite to that of the desired signal, if signals having different values are output depending upon the mask pattern, it would be difficult to appropriately set the feedback amount (focus error signal value).

In light of the above, in the automatic focus adjusting mechanism according to the first embodiment, the aperture 26 of each of the focus adjusting aperture stops 24A and 24B is formed in substantially a rhomboid shape as shown in FIG. 3. The maximum width of the aperture 26 shown in FIG. 3 is set greater than the distance between two points at which the optical paths extending from the opposite ends of the object lens 52 to the center of the slit image on each image re-forming plane intersect the corresponding focus adjusting aperture plane. Namely, the maximum width of the aperture 26 is set to include, within the aperture, a major part of the widthways light amount distribution of the slit image. By setting the maximum width of the aperture 26 like this, the slit image can reliably be caught by the focus adjusting aperture stops 24A and 24B, even when a finest pattern that can be resolved by the object lens is formed on a mask. Further, the automatic focus adjusting mechanism can be designed so that a change in the level of the light amount detection signal due to a focus error little depends upon the mask pattern, which enables a feedback amount indicated by a feedback signal (focus error signal) sent to the focus adjusting unit 36 to be set easily.

Figure 9:
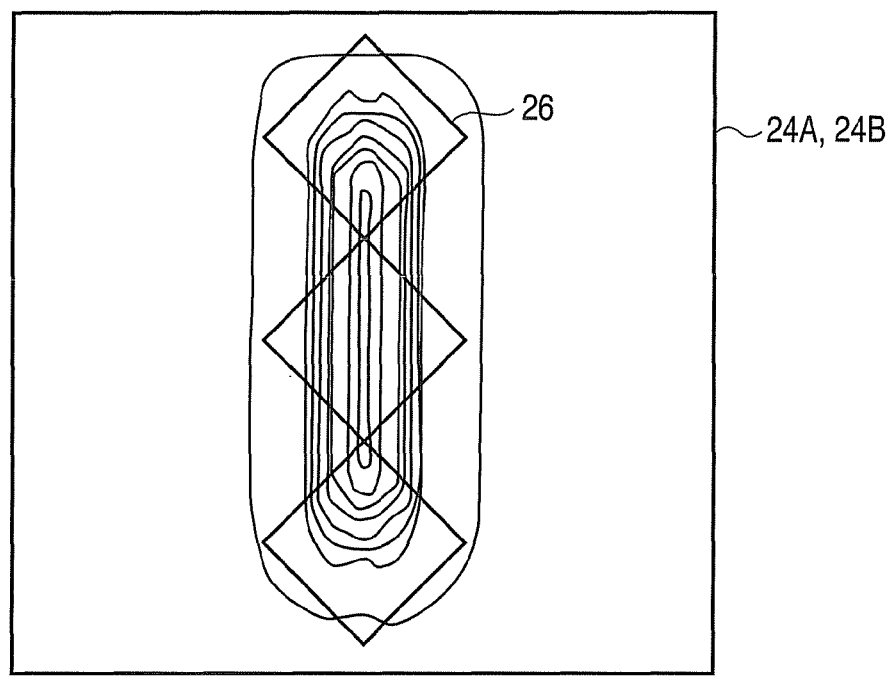
FIG. 9 is a schematic view illustrating a focus adjusting aperture stop of a shape different from that of the focus adjusting aperture stops shown in FIG. 1.
Figure 12:
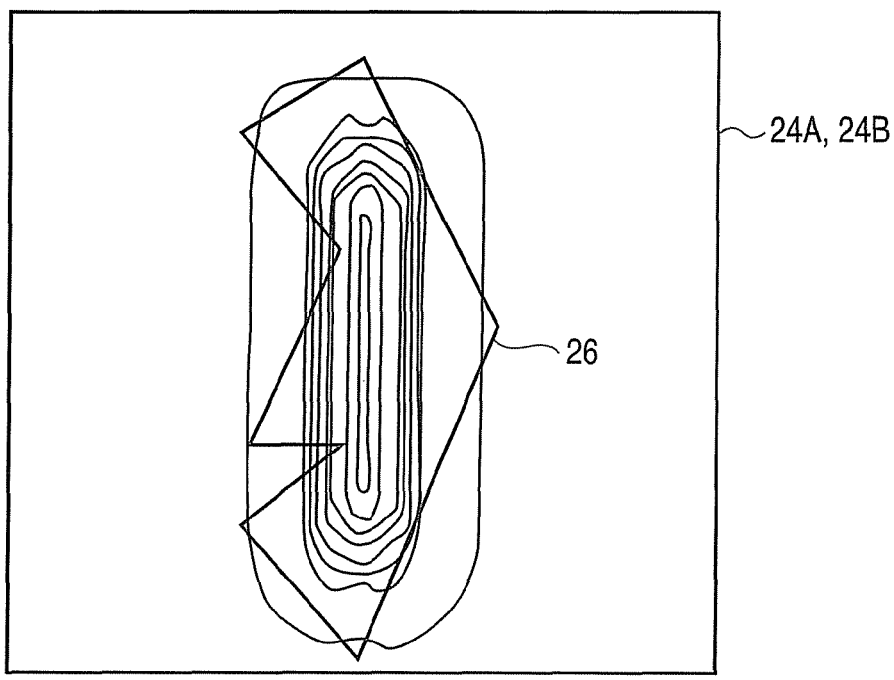
FIG. 12 is a schematic view illustrating a focus adjusting aperture stop of a shape different from that of the focus adjusting aperture stops shown in FIG. 1.

The aperture 26 of each of the focus adjusting aperture stops 24A and 24B is not limited to such a rhomboid shape as shown in FIG. 3A. It is sufficient if the remoter from the y axis the portions of the aperture 26 corresponding to divisions of the slit image that have a substantially equal length along the y axis, the shorter the lengths of the portions of the aperture 26 parallel to the y axis. FIGS. 9 to 14 show modifications in the shape of the aperture 26 formed in each of the focus adjusting aperture stops 24A and 24B. As shown in FIG. 9, a plurality of square or rhomboid apertures may be connected to each other with their diagonal lines aligned with each other, and be arranged along the length of the slit image. Alternatively, as shown in FIG. 10, a plurality of isosceles triangular apertures may be arranged along the slit image so that their apexes are aligned with the longitudinal axis of the slit image. Yet alternatively, as shown in FIG. 11, a plurality of triangular and rectangular apertures may be arranged along the slit image. Further, as shown in FIG. 12, the aperture(s) may be formed asymmetrical with respect to the y axis. By thus using the combination of a plurality of square or triangular apertures as the aperture 26, the mechanical strength of the focus adjusting aperture stop can be increased, thereby facilitating focal adjustment.

Figure 13:
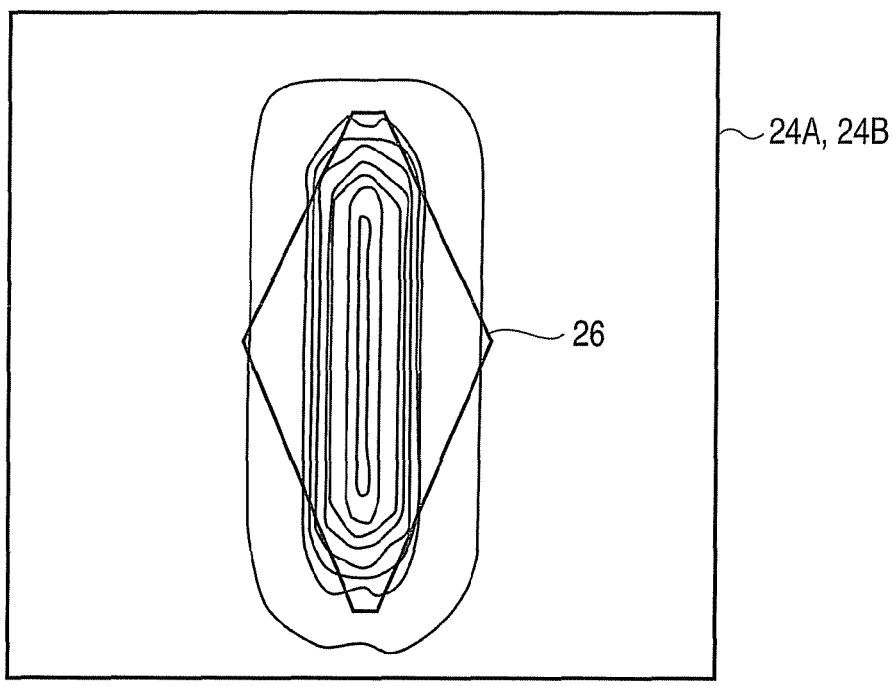
FIG. 13 is a schematic view illustrating a focus adjusting aperture stop of a shape different from that of the focus adjusting aperture stops shown in FIG. 1.

Yet alternatively, the aperture 26 of the focus adjusting aperture stop may be formed as shown in FIG. 13. In this case, the aperture is of substantially a rhomboid shape with lower and upper flat ends. In other words, the aperture is hexagonal. This shape is designed in view of the fact that even when no patterns are formed on the mask surface, the slit image formed on each focus adjusting aperture plane has a minimum width. By virtue of this shape, adjustment of the feedback amount is facilitated and stability of the feedback adjustment is enhanced.

Figure 14:
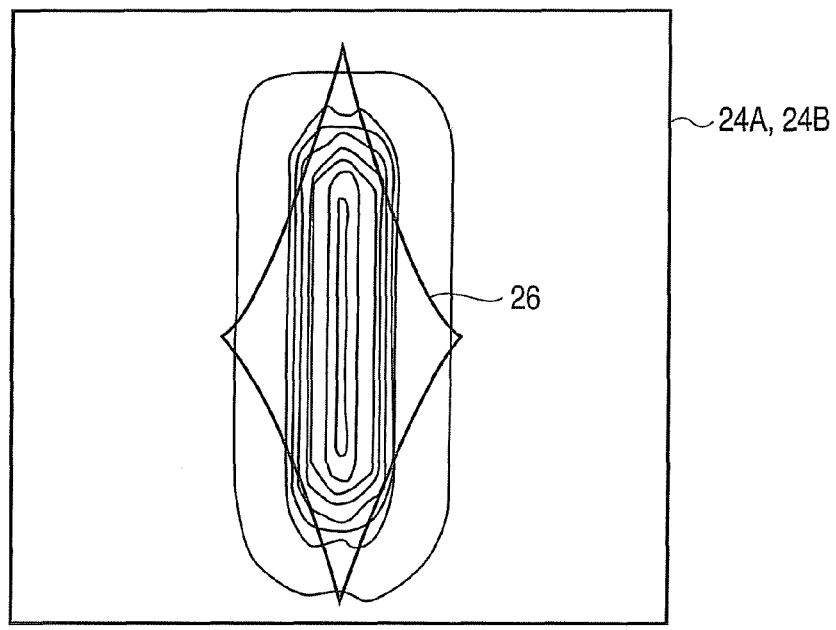
FIG. 14 is a schematic view illustrating a focus adjusting aperture stop of a shape different from that of the focus adjusting aperture stops shown in FIG. 1.

Yet further, the edge of the aperture 26 may be curved as shown in FIG. 14. In this case, the length of the aforementioned line segment parallel to the y axis (or aperture length) is determined by a nonlinear function such that the remoter from the y axis the line segment, the shorter the length thereof, i.e., the aperture length decreases in accordance with an increase distance from the y axis. Depending upon the system structure of the automatic focus adjusting mechanism, such a nonlinear function can enhance the linearity, with respect to a focus error, of the signal (focus error signal) finally output from the differential amplifier circuit.

The shapes of the aperture 26 shown in FIGS. 3A and 9 to 14 satisfy the condition that the remoter from the y axis the imaginary line segment defined in the aperture by the edge of the aperture and extending parallel to the y axis, the shorter the length of the line segment. Assuming that the imaginary line segment at position x is expressed by g(x), the remoter from the origin the position x, the less g(x). The shape of the aperture 26 is not limited to the above-described one. Apertures of other shapes can be employed if the shapes satisfy the condition.

As described above, the automatic focus adjusting mechanism according to the first embodiment can reliably detect an error in the focus and accurately adjust the focus, regardless of the pattern formed on the surface of a test sample. Further, the optical image acquisition apparatus according to an aspect of a present invention utilizes the automatic focus adjusting mechanism to acquire an optical image in focus of the test sample.

Second Embodiment

Figure 15A:
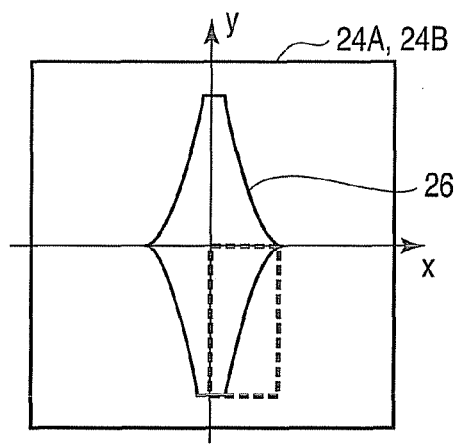
FIG. 15A is a schematic view illustrating a focus adjusting aperture stop incorporated in an automatic focus adjusting mechanism according to a second embodiment of the invention.

An optical image acquisition apparatus incorporating an automatic focus adjusting mechanism according to a second embodiment has substantially the same structure as the first embodiment shown as in FIG. 1. In the second embodiment, the apertures 26 of focus adjusting aperture stops 24A and 24B each have linear and curved edges as shown in FIG. 15A. Each of the curved edges of the aperture 26 is defined by a curve obtained by compressing a log function horizontally and/or vertically as shown in FIG. 5B. Part of the boundary defining the aperture 26, which is indicated by the broken line in FIG. 15A, is defined by the curve indicated by the broken line in FIG. 15B.

Figure 15B:
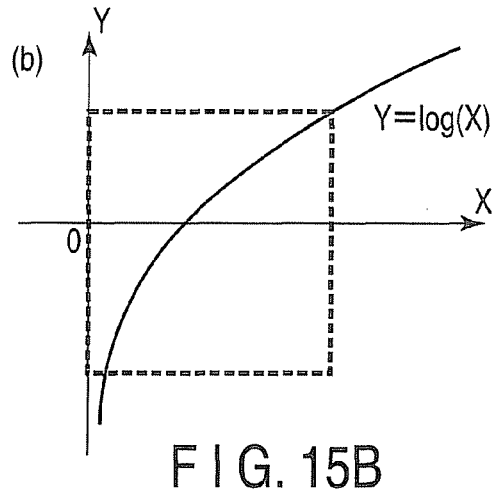
FIG. 15B is a graph indicating a curve that forms part of the aperture shape shown in FIG. 15A.
Figure 15C:
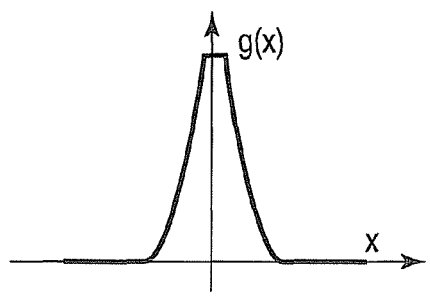
FIG. 15C is a graph indicating an aperture function associated with the aperture shown in FIG. 15A.

On each focus adjusting aperture plane, the center of the aperture 26 is set as the origin, the axis along the width of the aperture 26 is set as the x axis, and the axis along the length of the aperture 26 is set as the y axis. The length of the imaginary line segment at position x, which is defined in the aperture 26 by the edge of the aperture 26 and extends parallel to the y axis, is called an aperture function and represented by function g(x). As shown in FIG. 15C, the higher and the lower with respect to the origin the value of x, the lower the value of the aperture function g(x).

A description will now be given of a method for determining the shape of the aperture 26 shown in FIG. 15A. Each focus adjusting aperture plane is located so that the distance d from a desired image re-forming plane satisfies $A^2/2\lambda < d < B^2/2\lambda$. The light amount distribution on the x axis is given by f(x/d)/d, f(x) being a function corresponding to, for example, the shape of the aperture 26. The light amount I(d) passing through the aperture 26 of each of the focus adjusting aperture stops 24A and 24B is given by $$I(d) = \int_{-\infty}^{\infty} \frac{f(x/d)}{d} g(x) dx \qquad (1)$$

where g(x) is a function that assumes a value of 0 when $|x| > x_{max}$. Accordingly, the same result can be obtained regardless of whether the integral interval is set to $-\infty$ to $+\infty$, or $-x_{max}$ to $x_{max}$.

If the distance d is varied in accordance with a focus error, the light amount I(d) varies by a change I'(d) given by the following equation (2):

$$I'(d) = -\frac{1}{d^3} \int_{-\infty}^{\infty} \{xf'(x/d) + d \cdot f(x/d)\}g(x)dx \qquad (2)$$

$$= \frac{1}{d^2} \int f(x/d) xg'(x) dx$$

where f' and g' represent the first-order differential functions of f and g, respectively. When a slight change in d is caused by a slight focus error, the light amount difference signal obtained by calculating the difference between the light amount detection signals detected by the two focus adjusting aperture stops 24A and 24B is proportional to the value obtained by multiplying the change in d by I'(d).

Assume here that the light amount distribution at each focus adjusting aperture plane varies in accordance with the pattern formed on the mask. Namely, assume that the function form of the function f(x) varies in accordance with the patterned mask. It is considered that even when the light amount distribution varies, the light amount of the entire image forming plane, i.e., the amount of the segment light beam passing through the aperture 26, does not significantly vary. Accordingly, also in the assumed case, the following equation (3) can be established:

$$\int_{-x_{max}}^{x_{max}} \frac{f(x/d)}{d} dx = \text{const.} \qquad (3)$$

Where the equation (3) is established, if function g(x) that satisfies xg'(x)=const is determined, the differential value I'(d) of the light amount detection value can be kept constant even if the function form of the function f(x) varies. In other words, once the function g(x) that satisfies xg'(x)=const is determined, a change in the light amount detection value due to a focus error does not depend upon the pattern of the patterned mask surface. For example, such function g(x) is given by $$g(x) = a - b\log(|x|) \qquad (4)$$

where a and b are constant. Accordingly, the aperture 26 shown in FIG. 15A can be formed using a curve determined from the equation (4). However, this function diverges to $=-\infty$ when $x \rightarrow 0$. As shown in FIG. 15B, the range in which g(x) has limited values is determined so that each of the upper and lower ends of the aperture 26 has a sufficiently narrow width with respect to a change in f(x/d)/d, and the boundary (edge) of the aperture 26 is determined based on the curve within the determined range. As a result, a practical aperture 26 can be obtained. As shown in FIG. 15A, the aperture 26 has a shape obtained by linearly cutting the upper and lower ends. The edge of the aperture 26 included in the broken-line rectangle shown in FIG. 15A is obtained by expanding and/or reducing the broken-line rectangle shown in FIG. 15B horizontally and/or vertically so that the upper and left sides of the rectangle coincide with the x and y axes, respectively.

By forming such an aperture as the above in each of the focus adjusting aperture stops 24A and 24B, the light amount difference signal calculated from the light amount detection signals of the focus adjusting aperture stops 24A and 24B can have a constant output value according to a focus error regardless of the pattern on the mask surface. This enables the signal processing unit 34 to return, to the focus adjusting unit 36, a feedback signal corresponding to the light amount difference signal, thereby realizing reliable feedback control.

As described above, by determining the shape of the aperture 26 of each of the focus adjusting aperture stops 24A and 24B based on a curve according to a logarithmic function, the degree of dependence of the light amount detection signal upon the pattern formed on the mask surface can be reduced. Further, the shape of the aperture 26 is not limited to the curve according to the logarithmic function. Even the shape of the aperture 26 shown in, for example, FIG. 14, which is formed by edges outwardly projecting from the center of the aperture, can also reduce the degree of dependence upon the pattern on the mask surface.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for acquiring an optical image, comprising:
 a movable table on which a test sample having a patterned surface is mounted;
 a light source configured to apply first and second light beams on the patterned surface to form first and second areas, respectively, the first area being defined as an image pickup area on the patterned surface and the second area being formed as a focus adjusting area to have a substantially rectangular shape with long and short sides;
 an image acquiring unit configured to detect a third light beam which is reflected from the first area or is transmitted through the first area, and acquire an image of the image pick up area from the third light beam when the patterned surface is located in an image pickup position;
 a focusing optical system including a splitting element configured to split a fourth light beam into first and second segment light beams, which is reflected from the second area, wherein the first and second segment light beams are directed to first and second optical paths and focused on first and second image forming planes, respectively, when the patterned surface is positioned at the image pickup position;
 a first aperture stop having a first aperture, which is located in the first optical path between the first image forming plane and the splitting element, wherein the first aperture has first and second axes crossing on a first origin point and corresponding to the short and long sides, respectively, and has a first aperture length along the second axis, and the first aperture length is maximum on the first origin point and is decreased along the first axis depending on a first distance from the first origin point along the first axis;
 a second aperture stop having a second aperture, which is located in the second optical path such that the second image forming plane is arranged between the splitting element and the second aperture, wherein the first aperture has third and fourth axes crossing on a second origin point and corresponding to the short and long sides, respectively, and has a second aperture length along the third axis, and the second aperture length is maximum on the second origin point and is decreased along the third axis depending on a second distance from the second origin point along the third axis;
 a detection unit configured to detect the first and second segment light beams passing through the first and second apertures to output first and second detection signals, respectively; and
 a control unit configured to control a position of the movable table based on the first and second detection signals.

2. The apparatus according to claim 1, wherein the control unit controls the position of the movable table to make the first detection signal coincide with the second detection signal.

3. The apparatus according to claim 1, wherein
 the second light beam has a wavelength of $\lambda$;
 when the patterned surface is positioned at the image pickup position, a first image that has a width of A along the first axis and a length of B along the second axis is formed on the first image forming plane, a second image that has the width of A along the third axis and a length of B along the fourth axis is formed on the second image forming plane, and the first and second aperture stops are located away from the first and second image forming planes by a distance d satisfying $A^2/2\lambda < d < B^2/2\lambda$, respectively.

4. The apparatus according to claim 1, wherein
 the focusing optical system further includes an object lens arranged in opposition to the movable table;
 an optical axis of the second light beam intersects with the second area at a first intersecting point;
 component rays of the fourth light beam directed from the first intersecting point to an outermost peripheral edge of the object lens intersect at a second intersecting point and a third intersecting point on the first aperture stop, and intersect at a fourth intersecting point and a fifth intersecting point on the second aperture stop; and
 the first and second apertures have first and second maximum widths along the second and forth axes, respectively, each of the first and second maximum widths being greater than each of a distance between the second and third intersecting points, and a distance between the fourth and fifth intersecting points.

5. An apparatus for acquiring an optical image, comprising:
 a movable table on which a test sample having a patterned surface is mounted;
 a first light source configured to apply a first light beam on another surface of the test sample opposite to the patterned surface to form a first area, the first area being defined as an image pickup area on the patterned surface;
 a second light source configured to apply a second light beam on the patterned surface to form a second area, the second area being formed as a focus adjusting area to have a substantially rectangular shape with long and short sides;
 an image acquiring unit configured to detect a third light beam which is transmitted through the first area, and acquire an image of the image pick up area from the third light beam when the patterned surface is located in an image pickup position;
 a focusing optical system including a splitting element configured to split a fourth light beam into first and second segment light beams, which is reflected from the second area, wherein the first and second segment light beams are directed to first and second optical paths and focused on first and second image forming planes, respectively, when the patterned surface is positioned at the image pickup position;
 a first aperture stop having a first aperture, which is located in the first optical path between the first image forming plane and the splitting element, wherein the first aperture has first and second axes crossing on a first origin point and corresponding to the short and long sides, respectively, and has a first aperture length along the second axis, and the first aperture length is maximum on the first origin point and is decreased along the first axis depending on a first distance from the first origin point along the first axis;
 a second aperture stop having a second aperture, which is located in the second optical path such that the second image forming plane is arranged between the splitting element and the second aperture, wherein the first aperture has third and fourth axes crossing on a second origin point and corresponding to the short and long sides, respectively, and has a second aperture length along the third axis, and the second aperture length is maximum on the second origin point and is decreased along the third axis depending on a second distance from the second origin point along the third axis;
a detection unit configured to detect the first and second segment light beams passing through the first and second apertures to output first and second detection signals, respectively; and
a control unit configured to control a position of the movable table based on the first and second detection signals.

6. An automatic focus adjusting apparatus comprising:
a movable table on which a test sample having a patterned surface is mounted;
a light source configured to apply a light beam on the patterned surface to form an area, the area being formed as a focus adjusting area to have a substantially rectangular shape with long and short sides;
a focusing optical system including a splitting element configured to split a second light beam into first and second segment light beams, which is reflected from the area, wherein the first and second segment light beams are directed to first and second optical paths and focused on first and second image forming planes, respectively, when the patterned surface is positioned at a prescribed position;
a first aperture stop having a first aperture, which is located in the first optical path between the first image forming plane and the splitting element, wherein the first aperture has first and second axes crossing on a first origin point and corresponding to the short and long sides, respectively, and has a first aperture length along the second axis, and the first aperture length is maximum on the first origin point and is decreased along the first axis depending on a first distance from the first origin point along the first axis;
a second aperture stop having a second aperture, which is located in the second optical path such that the second image forming plane is arranged between the splitting element and the second aperture, wherein the first aperture has third and fourth axes crossing on a second origin point and corresponding to the short and long sides, respectively, and has a second aperture length along the third axis, and the second aperture length is maximum on the second origin point and is decreased along the third axis depending on a second distance from the second origin point along the third axis;
a detection unit configured to detect the first and second segment light beams passing through the first and second apertures to output first and second detection signals, respectively; and
a control unit configured to control a position of the movable table based on the first and second detection signals.

* * * * *